(12) United States Patent
Stickler et al.

(10) Patent No.: US 10,940,936 B2
(45) Date of Patent: Mar. 9, 2021

(54) STRINGER WITH PLANK PLY AND SKIN CONSTRUCTION FOR AIRCRAFT

(71) Applicant: THE BOEING COMPANY, Chicago, IL (US)

(72) Inventors: Patrick B. Stickler, Everett, WA (US); Forouzan Behzadpour, Woodinville, WA (US)

(73) Assignee: THE BOEING COMPANY, Chicago, IL (US)

( * ) Notice: Subject to any disclaimer, the term of this patent is extended or adjusted under 35 U.S.C. 154(b) by 715 days.

(21) Appl. No.: 15/647,722

(22) Filed: Jul. 12, 2017

(65) Prior Publication Data
US 2019/0016436 A1    Jan. 17, 2019

(51) Int. Cl.
| | |
|---|---|
| *B64C 3/18* | (2006.01) |
| *B64C 1/06* | (2006.01) |
| *B64C 1/12* | (2006.01) |
| *B64C 3/26* | (2006.01) |
| *B29C 70/30* | (2006.01) |
| *B29D 99/00* | (2010.01) |
| *B32B 5/26* | (2006.01) |
| *B64C 3/20* | (2006.01) |
| *B64C 1/00* | (2006.01) |
| *B29L 31/30* | (2006.01) |

(52) U.S. Cl.
CPC ............. *B64C 3/182* (2013.01); *B29C 70/30* (2013.01); *B29D 99/0014* (2013.01); *B32B 5/26* (2013.01); *B64C 1/064* (2013.01); *B64C 1/12* (2013.01); *B64C 3/20* (2013.01); *B64C 3/26* (2013.01); *B29L 2031/3082* (2013.01); *B29L 2031/3085* (2013.01); *B32B 2605/18* (2013.01); *B64C 2001/0072* (2013.01)

(58) Field of Classification Search
CPC .......... B64C 3/18; B64C 3/182; B64C 3/185; B64C 3/187; B64C 3/20; B64C 1/12; B64C 3/26; B64C 1/064; B64C 2001/0072
See application file for complete search history.

(56) References Cited

U.S. PATENT DOCUMENTS

| | | | | |
|---|---|---|---|---|
| 5,639,535 | A * | 6/1997 | McCarville | B29C 70/30 428/119 |
| 2011/0268926 | A1* | 11/2011 | Cruz Dominguez | B64C 1/12 428/172 |
| 2018/0001590 | A1* | 1/2018 | Carlson | B32B 3/12 |

* cited by examiner

*Primary Examiner* — Brian M O'Hara
(74) *Attorney, Agent, or Firm* — Marshall, Gerstein & Borun LLP (57) ABSTRACT

A composite assembly includes a composite skin which includes a plurality of composite plies and a composite stringer secured to the composite skin. A first composite plank ply is positioned between a first pair of composite plies of the plurality of composite plies of the composite skin; the first composite plank ply has a width dimension less than a width dimension of the plurality of composite plies of the composite skin; and the first composite plank ply extends along a length of the composite stringer. At least a portion of the composite stringer is positioned in overlying relationship with the first composite plank ply.

20 Claims, 6 Drawing Sheets

STRINGER WITH PLANK PLY AND SKIN CONSTRUCTION FOR AIRCRAFT

FIELD

This disclosure relates to a stringer reinforcement structure for a skin of an aircraft and more particularly to a composite stringer reinforcement structure and composite skin assembly of the aircraft.

BACKGROUND

Stringer reinforcement structures are secured to a skin of an aircraft and provide structural support to the skin. In an application of stringers in a fuselage, the stringers extend in a direction along a length of the fuselage and in an application of stringers within a wing the stringers extend in a direction along a length of the wing. The stringer reinforcement structure is a stiffening member which provides resistance with respect to bending of the load carrying skin.

As mentioned above, stringer reinforcement structures are used in the construction of a fuselage and in the construction of a wing of an aircraft. The stringer which is secured to the skin of the fuselage is generally also attached to formers, also referred to as frames. The frame provides support for the stringer and the stringer provides load transference from the fuselage skin to the frame. The primary function of the stringer reinforcement structures with respect to the fuselage is to transfer aerodynamic loads acting on the skin of the fuselage during operation of the aircraft onto the frame of the aircraft.

In wing construction, stringer reinforcement structures, as mentioned above, run in a direction along the length of the wing and are secured to the skin of the wing. The stringer reinforcement structures are also secured to ribs and spars. The ribs and spars provide support to the stringer and the stringer provides load transference of bending loads the stringer receives from the wing skin and transfers the bending loads to the ribs and spars.

In the construction of composite stringers used in conjunction with composite wing or fuselage skin, a base or a charge of a composite stringer reinforcement structure adjoins and secures to the internal surface of the fuselage or wing skin. Composite stiffened panels, such as a stringer and a skin, inherently tend to distort due to the differences in mechanical properties between the skin and the stringers as a result of the curing process. It is desired to reduce distortion in the fabrication of a reinforced composite panel construction such as a stringer employed as a stiffening member for a skin panel. In addition, it is desired to increase flexing strength of a wing and at the same time reduce the size and weight of the stringers and thereby enhance the aircraft performance.

SUMMARY

An example of a composite assembly includes a composite skin which includes a plurality of composite plies and a composite stringer secured to the composite skin. A first composite plank ply is positioned between a first pair of composite plies of the plurality of composite plies of the composite skin; the first composite plank ply has a width dimension less than a width dimension of the plurality of composite plies of the composite skin; and the first composite plank ply extends along a length of the composite stringer. At least a portion of the composite stringer is positioned in overlying relationship with the first composite plank ply.

An example of a method for assembling a composite assembly includes the steps of laying up a plurality of composite plies for a composite skin of an aircraft and positioning a first composite plank ply between a first pair of composite plies of the plurality of plies of the composite skin. The method further includes laying up a composite stringer for securement to the composite skin, wherein: the first composite plank ply has a width dimension less than that of the plurality of composite plies of the composite skin; the first composite plank ply extends along a length of the composite stringer; and at least a portion of the composite stringer is positioned in overlying relationship with the first composite plank ply.

The features, functions, and advantages that have been discussed can be achieved independently in various embodiments or may be combined in yet other embodiments further details of which can be seen with reference to the following description and drawings.

DESCRIPTION

Figure 1:
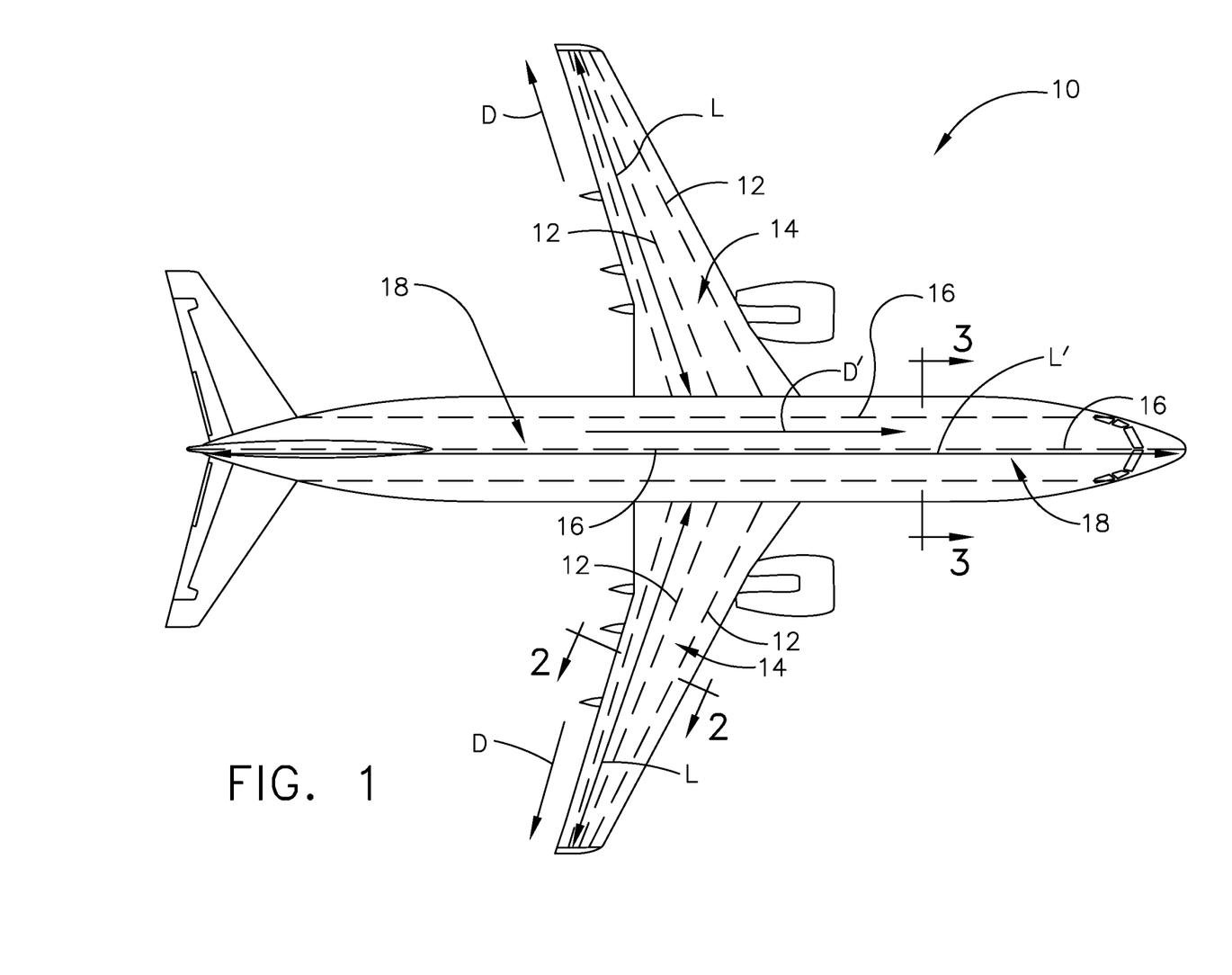
FIG. 1 is a top plan view of an aircraft with stringer locations schematically shown within the wings and the fuselage of the aircraft.

An example of the use of a composite stringer and a composite skin assembly of an aircraft is shown in FIG. 1. Aircraft 10 is shown with stringer locations 12 schematically shown as they extend along length L of wings 14 of aircraft 10. Additionally, locations 16 of stringers are schematically shown as they extend along and positioned about central length L' of fuselage 18 of aircraft 10.

Figure 2:
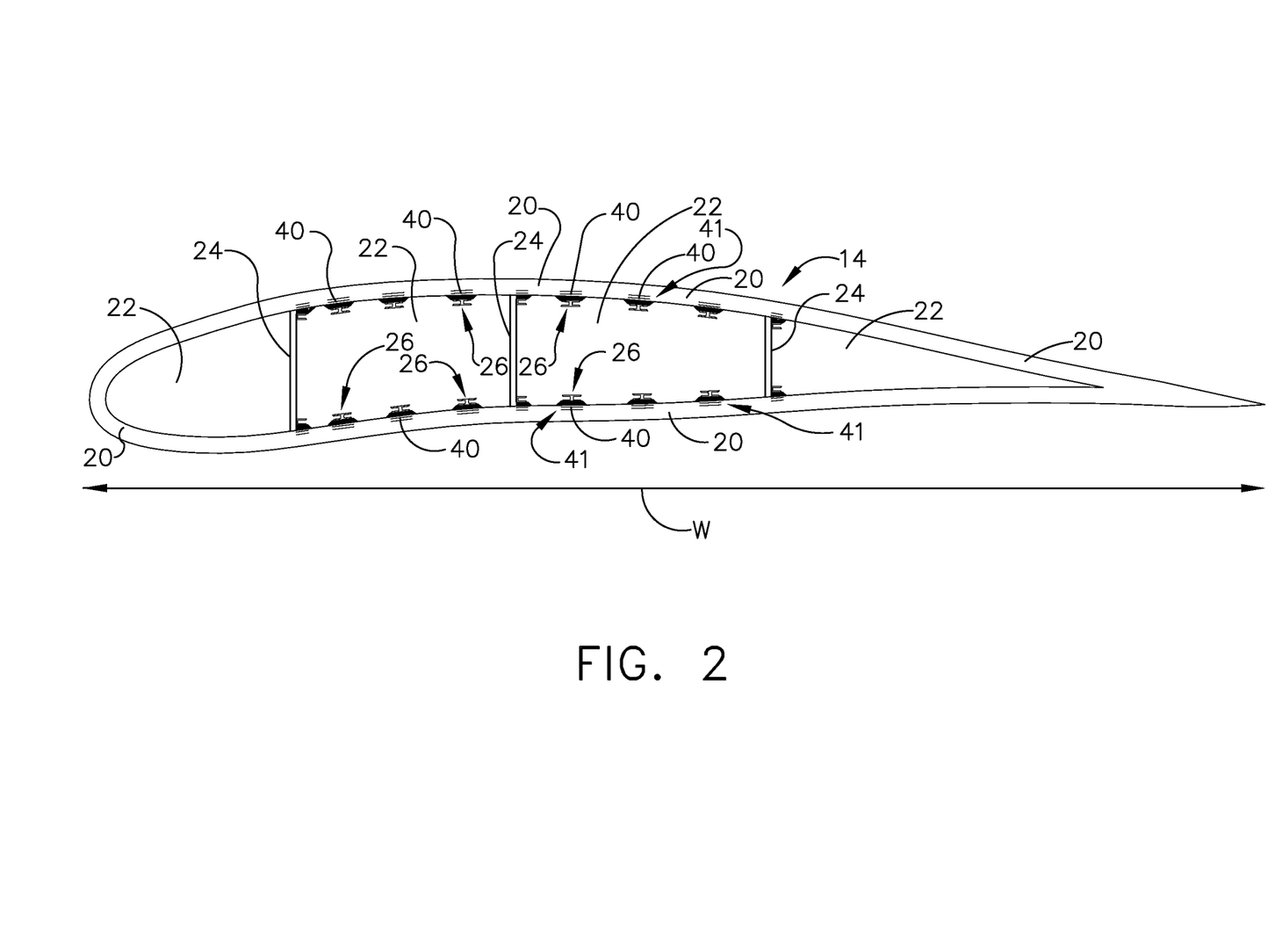
FIG. 2 is a cross section schematic view along line 2-2 as shown in FIG. 1 showing the wing skin, stringers, spars and a rib of the wing.
Figure 3:
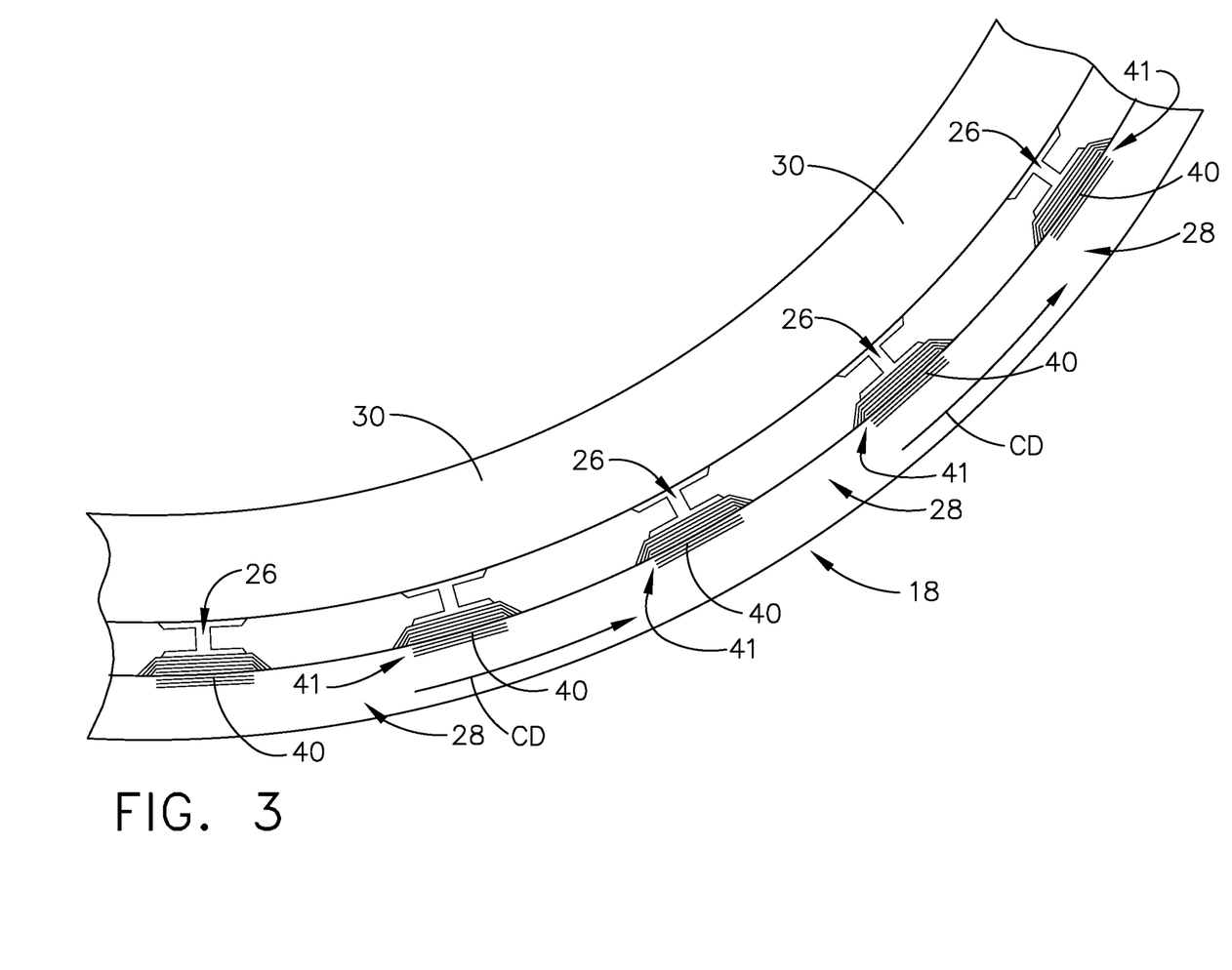
FIG. 3 is a partial cross section schematic view along line 3-3 in FIG. 1 showing a fuselage skin, stringers and a frame.

In referring to FIGS. 2 and 3, cross section schematic view of wing 14 and a partial cross section schematic view of fuselage 18 are shown respectively. In referring to FIG. 2, wing 14 is constructed from composite wing skin 20 which encloses wing 14. Rib 22 extends along width W of wing 14. Wing 14 includes a plurality of ribs 22 (not shown) spaced apart from one another along length L of each wing 14 and each rib 22 extends along width W of wing 14. Spars 24, as shown in FIG. 2 are spaced apart from one another along width W of wing 14 and extends along length L of each wing 14 (not shown). Composite stringers 26 are secured to composite wing skin 20 and extend along length L of each wing 14 wherein composite stringers 26 are also secured to ribs 22 and spars 24. As discussed earlier, composite stringers 26 are stiffener members with respect to composite wing skin 20 such that composite stringers 26 receive bending load which composite wing skin 20 experiences during flight operation and transfers that load to ribs 22 and spars 24. As a result, composite stringers 26 provide bending resistance for wing skin 20. The securement of composite stringers 26 to composite wing skin 20 can be achieved by a number of known methodologies such as by way of co-cure, co-bonding and/or post bonding methods.

In addition, wing 14 further includes first composite plank ply 40 associated with composite stringers 26, as will be discussed in further detail herein, wherein first composite plank ply 40 is selectively positioned between plies of composite wing skin 20, as will a plurality of composite plank plies 41 in the example discussed herein. The selective positioning of the first composite plank ply 40 between plies of wing skin 20 and/or fuselage skin 28 allows the fabricator to use unidirectional fibers for first composite plank ply 40. With the unidirectional fibers positioned to extend along a length of the wing skin 20 and/or length of the fuselage skin 28, this arrangement will provide enhanced flexure strength in the length direction to that particular skin as will be discussed below.

In referring to FIG. 3, fuselage 18 is shown in a partial cross section schematic view which shows composite fuselage skin 28 connected to composite stringers 26 and composite stringers 26 are in turn connected to frame 30 of aircraft 10. Composite stringers 26 are also stiffener members with respect to fuselage skin 28 and receive aerodynamic loads, which composite fuselage skin 28 experiences during flight operations, and transfers those loads to frame 30. As seen in FIG. 3, first composite plank ply 40 is associated with composite stringers 26, as will be discussed in further detail herein, and is selectively positioned between plies of composite fuselage skin 28 as, in this example, will a plurality of composite plank plies 41.

In referring to FIGS. 4 and 5, the application of first composite plank ply 40 will be discussed for both wing 14 and fuselage 16 assemblies. Composite skin 34 will be generally representative of both composite wing skin 20 and composite fuselage skin 28. Thus, in referring to composite skin 34, composite skin 34 will generally apply to both composite wing skin 20 and composite fuselage skin 28 unless otherwise identified herein. In this example, plurality of composite plank plies 41 are positioned within plurality of composite plies 38 of composite skin 34 as will be discussed in further detail herein.

Figure 4:
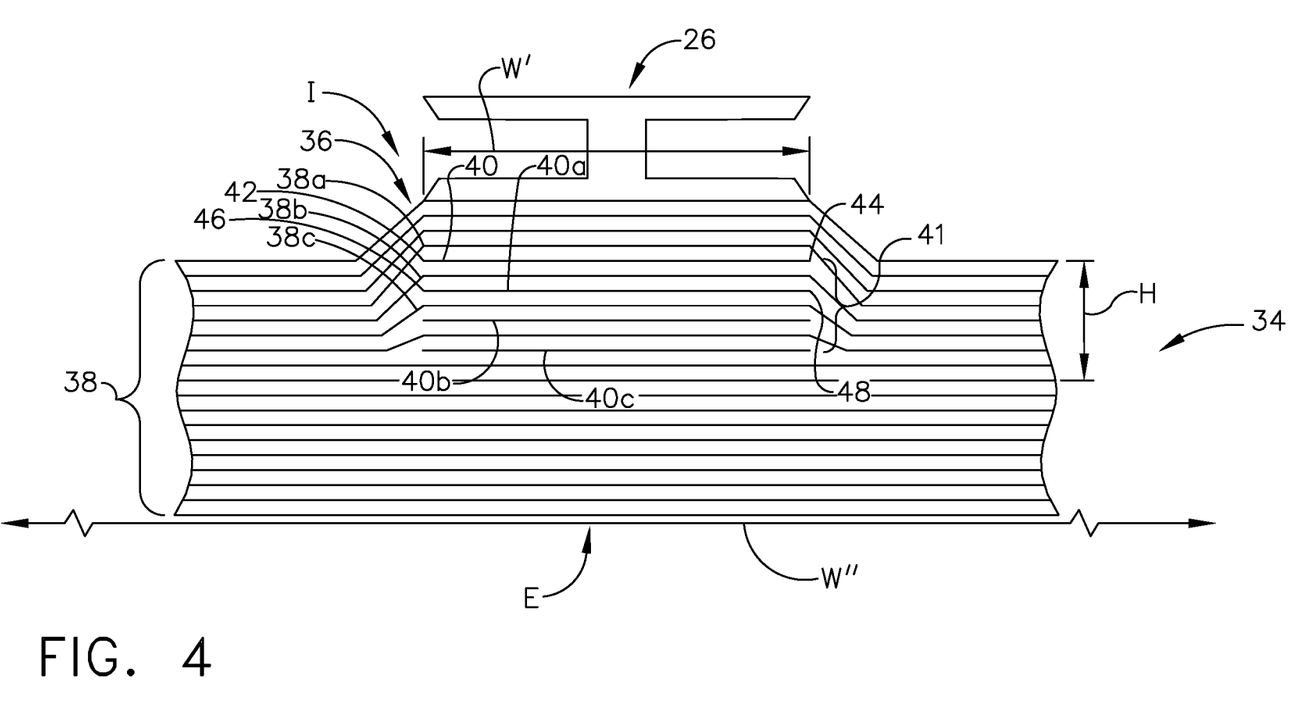
FIG. 4 is an enlarged cross section partial view of a stringer and skin assembly with composite plank plies positioned between plies of the plurality of plies of the composite skin of the aircraft showing a first example of a configuration of the opposing edges of the composite plank plies in alignment.

With respect to wings 14, in referring to FIG. 4, composite assembly 36 includes composite stringer 26 secured to composite skin 34, wherein composite skin 34 includes a plurality of composite plies 38 and first composite plank ply 40 is positioned within plurality of composite plies 38. In this example, composite stringer 26 includes an I-stringer and first composite plank ply 40 along with, in this example, second, third and fourth composite plank plies 40a, 40b, and 40c, provides plurality of composite plank plies 41. First composite plank ply 40, in this example, is positioned between first pair of composite plies which includes plies 38a and 38b of plurality of plies 38 of composite skin 34. This arrangement of positioning first composite plank ply 40 positioned between two composite plies 38a and 38b of plurality of plies 38 of composite skin 34 is applicable for the arrangement with respect to composite wing skin 20, as seen in FIG. 2. As seen in FIG. 4, a plurality of composite plank plies 41 are shown which includes first composite plank ply 40, second composite plank ply 40a and in addition third and fourth composite plank plies 40b and 40c in this example. First composite plank ply 40, second composite plank ply 40a as well as third and fourth composite plank plies 40b and 40c each has a width dimension W' less than a width dimension W" of the plurality of composite plies 38 of the composite skin 34, representative of composite wing skin 20. First composite plank ply 40 as well as the plurality of composite plank plies 41 extend in direction D, as seen in FIG. 1 along a length of composite stringer 26 which in this example is length L of wing 14. In addition at least a portion of composite stringer 26 is positioned in overlying relationship with first composite plank ply 40. As seen in FIG. 2, at least a portion of composite stringer 26 is positioned in overlying relationship with first composite plank ply 40, regardless of where composite stringer 26 is positioned within wing 14 and regardless with respect to composite plies 38 being positioned between composite stringer 26 and first composite plank ply 40, as seen in FIG. 4.

A composite stringer 26 can be selected from a wide variety of configurations and employed in the fabrication of aircraft 10. The fabricator can select a configuration for composite stringer 26 which will best suit the particular geometries of the application and performance requirements needed to be attained. A particular composite stringer 26 to be employed in constructing a wing 14 or fuselage 18 can include one of an I-stringer, hat stringer, J-stringer, blade stringer and Z-stringer as well as others.

In utilizing composite stringers 26 secured to composite skin 34 in wings 14, composite skin 34 extends along length L and width W of wings 14 of aircraft 10 as discussed above and as seen in FIGS. 1 and 2. As seen in FIG. 1, composite stringers 26 extend in direction D along length L of wing 14 of aircraft 10.

First composite plank ply 40, as well as in this example plurality of composite plank plies 41 each includes a plurality of unidirectional fibers (not shown) extending along direction D of composite stringers 26 along length L of wings 14. This arrangement of the unidirectional fiber plies provides enhanced flexure strength to composite wing skin 20 and permits composite stringers 26, ribs 22 and spars 24 to be downsized with the enhanced flexure strength of composite wing skin 20 being strengthened with first composite plank ply 40 and in this example plurality of composite plank plies 41 having unidirectional fibers extending in direction D of length L of wing 14. This arrangement also provides for less distortion in the curing of the assembly which includes composite stringer 26 and wing skin 20. With positioning first composite plank ply 40 separated from second composite plank ply 40a as well as from third and fourth composite plank plies 40b, and 40c and maintaining these composite plank plies separated from one another with being positioned between composite plies 38 of composite skin 34, the fabricator is allowed to utilize this arrangement of unidirectional fibers within the plurality of composite plank plies 41 and provide the beneficial enhanced flexure strength and diminished distortion from curing.

Second composite plank ply 40a is positioned between a second pair of composite plies of plurality of composite plies 38 of composite skin 34 of wing 12. Second pair includes in this example composite plies 38b and 38c of plurality of composite plies 38 of composite skin 34. Second pair of composite plies of plurality of plies 38 can include a pair of plies wherein the plies do not have a ply in common with the first pair of composite plies. Each of first and second composite plank plies 40 and 40*a* has the same width dimension W', as seen in FIG. 4. The width dimension W' extends in the same direction as width W of wing 14 as seen in FIG. 2. First composite plank ply 40 and second composite plank ply 40*a* have a first configuration wherein opposing edges 42 and 44 for ply 40 and opposing edges 46 and 48 for ply 40*a* are positioned in alignment with one another as seen in FIG. 4. In this first example, plurality of composite plank plies 41 have ends in alignment.

Figure 5:
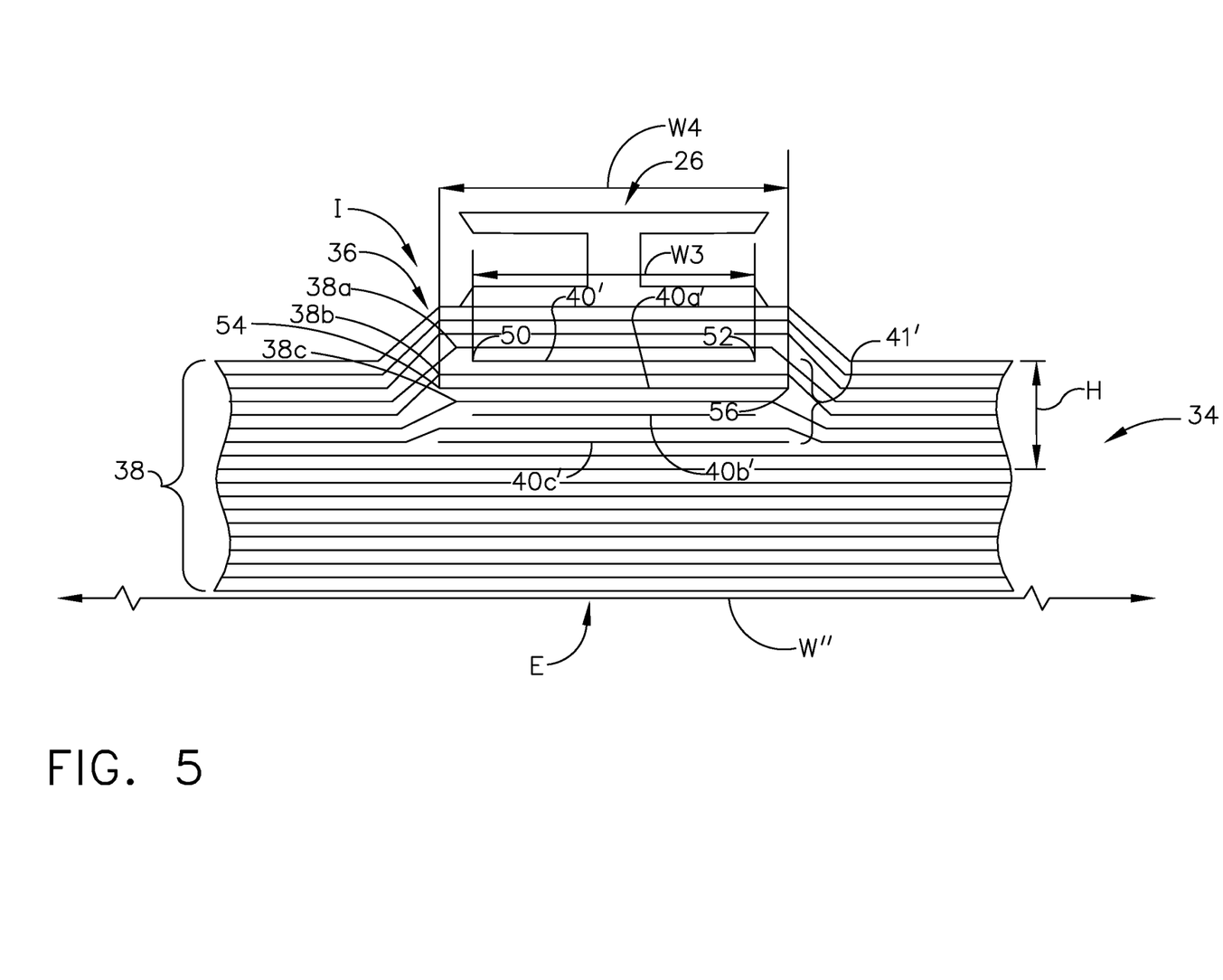
FIG. 5 is an enlarged cross section partial view of the stringer and skin assembly of FIG. 4 which shows a second example of a configuration of the opposing edges of composite plies of the composite plank plies not in alignment.

In referring to FIG. 5, a second example of a configuration for first composite plank ply 40' and second composite plank ply 40*a*' each have different width dimension W3 and width dimension W4 respectively. The width dimensions W3 and W4 extend in the same direction as width W of wing 14 as seen in FIG. 2. First and second composite plank plies 40' and 40*a*' each have opposing edges 50 and 52 for ply 40' and opposing edges 54 and 56 for ply 40*a*' which are not generally in alignment with one another.

As seen in FIG. 4, first and second composite plank plies 40 and 40*a* interleave with plurality of composite plies 38 of composite skin 34 such as with first pair of composite plies 30*a* and 30*b* and second pair of composite plies 30*b* and 30*c*. This is similarly seen in FIG. 5 with respect to first and second composite plank plies 40' and 40*a*' being interleaved as first composite plank ply 40' being positioned between first pair of plies 38*a* and 38*b* and second composite plank ply 40*a*' being positioned between second pair of plies 38*b* and 38*c*.

As seen in FIG. 4 first and second pair of composite plies 38*a*, 38*b* and 38*b*, 38*c* of the plurality of composite plies 38 of the composite skin 34 of the wing 14 are positioned within a half of a stack H of the plurality of composite plies 38 of the composite skin 34 of wing 14. This is also the case for different pairs of composite plies 38 of composite skin 34 in which a composite plank ply is positioned there between, as seen in FIGS. 4 and 5. In the example shown in FIG. 4, the plurality of composite plank plies 41 which includes first, second, third and fourth composite plank plies 40, 40*a*, 40*b*, and 40*c* are each positioned between a pair of composite plies 38 positioned in the half of the stack H of the plurality of composite plies 38 of the composite skin 34 positioned on an interior side I of composite skin 34 of aircraft 10 which opposes an exterior side E of composite skin 34 of aircraft 10 for wing 14. In the example shown in FIG. 5, the plurality of composite plank plies 41' which includes first, second, third and fourth composite plank plies 40', 40*a*', 40*b*' and 40*c*' are each positioned between a pair of composite plies 38 positioned in the half of the stack H of the plurality of composite plies 38 of the composite skin 34 positioned on an interior side I of skin 34 of aircraft 10 which opposes an exterior side E of skin 34 of aircraft 10 for wing 14.

With respect to fuselage 18, in referring to FIG. 4, composite assembly 36 includes composite stringer 26 secured to composite skin 34, wherein composite skin 34 includes plurality of composite plies 38 and first composite plank ply 40 is positioned within first pair of composite plies 38*a* and 38*b* of plurality of composite plies 38. In this example, composite stringer 26 includes an I-stringer. First composite plank ply 40 is positioned between two plies 38*a* and 38*b* of plurality of plies 38 of composite skin 34. This arrangement of positioning first composite plank ply 40 between first pair of composite plies 38*a* and 38*b* of plurality of plies 38 of composite skin 34 is applicable for the arrangement of first composite plank ply 40 with respect to composite fuselage skin 28, as seen in FIG. 3. As seen in FIG. 4, first composite plank ply 40 has a width dimension W' less than a width dimension W" of the plurality of composite plies 38 of the composite skin 34. In this example for fuselage skin 28, plurality of composite plank plies 41, which includes composite plank plies 40, 40*a*, 40*b*, and 40*c*, as well as, composite plies 38, which includes first pair of composite plies 38*a* and 38*b* of FIG. 4, all extend about central length L', as seen in FIG. 1, in a curvilinear direction CD as seen in FIG. 3. First composite plank ply 40 extends in direction D', as seen in FIG. 1 which extends along a length of composite stringer 26 which extends along central length L' of fuselage 18. In addition, at least a portion of composite stringer 26 is positioned in overlying relationship with first composite plank ply 40. As seen in FIG. 3, at least a portion of composite stringer 26 is positioned in overlying relationship with first composite plank ply 40, regardless of where composite stringer 26 is positioned about fuselage 18 and regardless with respect to composite plies 38 being positioned between composite stringer 26 and first composite plank ply 40 as representatively shown in FIG. 4.

A composite stringer 26, as discussed earlier, can be selected from a wide variety of configurations and employed in the fabrication of aircraft 10. The fabricator can select a configuration for composite stringer 26 which will best suit the particular geometries of the application and performance requirements needed to be attained. A particular composite stringer 26 to be employed in constructing a wing 14 or fuselage 18 can include one of an I-stringer, hat stringer, J-stringer, blade stringer and Z-stringer as well as others.

In utilizing composite stringers 26 secured to composite skin 34 in fuselage 18, composite skin 34 extends along central length L' and in a curvilinear direction CD about central length L' of fuselage 18 of aircraft 10 as seen in FIGS. 1 and 3.

First composite plank ply 40, as well as shown in this example second, third and fourth composite plank plies 40*a*, 40*b* and 40*c*, each includes a plurality of unidirectional fibers (not shown) extending along direction D' of composite stringers 26 along central length L' of fuselage 18. This arrangement of unidirectional fiber plies provides enhanced flexure strength to composite fuselage skin 28 and permits composite stringers 26 to be downsized with the enhanced flexure strength of composite fuselage skin 28 being strengthened. This arrangement also provides for less distortion in the curing of the assembly which includes composite stringer 26, first composite plank ply 40 and fuselage skin 28. As discussed earlier, with positioning first composite plank ply 40 separated from second composite plank ply 40*a* and positioning all composite plank plies, in this example, third and fourth composite plank plies plies 40*b* and 40*c* separated from one another, wherein each composite plank ply is positioned between pairs of plurality of plies fibers 38, the fabricator is allowed to utilize this arrangement of unidirectional fibers within the plurality of composite plank plies 41. This arrangement provides the beneficial enhanced flexure strength and diminished distortion from curing.

Second composite plank ply 40*a* is positioned between a second pair of composite plies of plurality of composite plies 38 of composite skin 34 of fuselage 18 as earlier discussed. Second pair includes pair of composite plies 38*b* and 38*c* of composite skin 34. As also discussed earlier, second pair of composite plies 30*b*, 30*c* of plurality of plies 38 can include a pair of plies wherein neither of the plies is common with a first pair of composite plies. Each of first and second composite plank plies 40 and 40*a* has the same width W' dimension, as seen in FIG. 4. The width dimension W' extends in the curvilinear direction CD as seen with respect to fuselage skin 28 in FIG. 3. First and second composite plies 40 and 40a have opposing edges 42 and 44 and opposing edges 46 and 48 respectively, which are positioned generally in alignment with one another. In this example, with first and second composite plank plies 40 and 40a extending along in curvilinear direction CD as seen in FIG. 3, have opposing edge 42 with respect to opposing edge 46 proximately in alignment with one another taking into consideration the reduction of radius of first and second composite plank plies 40 and 40a.

In referring to FIG. 5, a second example of a configuration for first composite plank ply 40' and second composite plank ply 40a' each have different width dimension W3 and width dimension W4 respectively. The width dimensions W3 and W4 extend in the same direction as mentioned above for composite plank plies 40 and 40a with respect to fuselage skin 28, in curvilinear direction CD as seen in FIG. 3. First and second composite plank plies 40' and 40a', in this second example, each have opposing edges 50 and 52 for ply 40' and edges 54 and 56 for ply 40a' not generally in alignment with one another with respect to radial direction with respect to curvilinear direction CD.

As seen in FIG. 4 first and second composite plank plies 40 and 40a interleave with plurality of composite plies 38 of composite skin 34 such as with first pair of composite plies 38a and 30b and second pair or composite plies 30b and 30c of fuselage 18. This is similarly seen in FIG. 5 with respect to first and second composite plank plies 40' and 40a' being interleaved as 40' being positioned between first pair of plies 38a and 38b and ply 40a' being positioned between second pair of plies 38b and 38c. The direction in which second and third composite plank plies 40a, 40b, and composite plies 38a, 38b and 38c extend, as seen in FIG. 4, as well as, second and third composite plank plies 40a', 40b' and composite plies 38a, 38b and 38c extend, as seen in FIG. 5, each extends in curvilinear direction CD of fuselage skin 28 as fuselage skin 28 extends about central length L' of fuselage 18.

As further shown in FIG. 4, first and second pair of composite plies 38a, 38b and 38b, 38c of the plurality of composite plies 38 of the composite skin 34 of the wing 14 are positioned within a half of a stack H of the plurality of composite plies 38 of the composite skin 34 of fuselage 18. This is also the case for different pairs of composite plies 38 of composite skin 34 as seen in FIG. 5 wherein a pair of composite plies 38 have a composite plank ply positioned there between. In the example shown in FIG. 4, the plurality of composite plank plies 41 which includes first, second, third and fourth composite plank plies 40, 40a, 40b and 40c are each positioned between pairs of composite plies 38 positioned in half of the stack H of the plurality of composite plies 38 of the composite skin 34 positioned on an interior side I of skin 34 of aircraft 10 opposing the exterior side E of composite skin 34 of aircraft 10 for fuselage 18. In the example shown in FIG. 5, the plurality of composite plank plies which includes first, second, third and fourth composite plank plies 40', 40a', 40b' and 40c' are each positioned between pairs of composite plies 38 positioned in the half of the stack H of the plurality of composite plies 38 of the composite skin 34 positioned on an interior side I of composite skin 34 of aircraft 10 opposing exterior side E of composite skin 34 of aircraft 10 as for fuselage 18.

Figure 6:
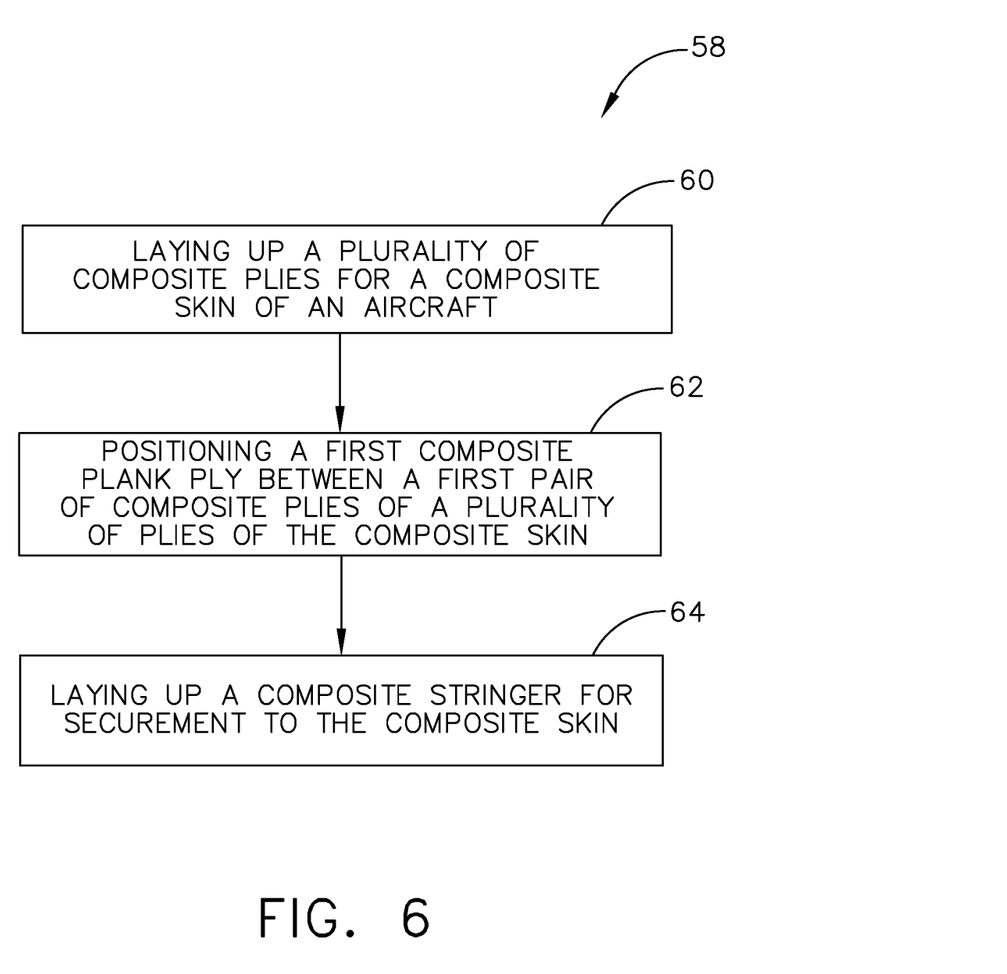
FIG. 6 is a flow chart of assembling the composite stringer, a first composite plank ply and composite skin assembly of an aircraft.

Method 58, as seen in FIG. 6, for assembling a composite assembly 36 includes step 60 of laying up a plurality of composite plies 38 for composite skin 34 of an aircraft 10. As discussed earlier, this includes composite skin 34 being a wing skin 20 and/or fuselage skin 28. Method 58 further includes step 62 of positioning first composite plank ply 40 between a first pair of composite plies 38a and 38b of plurality of composite plies 38 of composite skin 34. Method 58 further includes step 64 of laying up composite stringer 26 for securement to composite skin 34, wherein first composite plank ply 40 has a width dimension W', as do second, third and fourth composite plank plies 40a, 4b and 40c as seen in FIG. 4 in this example, which is less than width dimension W" of the plurality of composite plies 38 of composite skin 34. Also, as seen in FIG. 5, first composite plank ply 40', as well as second, third and fourth, composite plank plies 40a', 40b' and 40c, each has a width dimension, whether width dimension W3 and/or width dimension W4, which is less than width dimension W" of the plurality of composite plies 38 of composite skin 34.

First composite plank ply 40 extends along length L of wing 14 in which composite stringer 26 extends, as seen in FIG. 1, or along central length L' of fuselage 18 in which composite stringer 26 extends along as also seen in FIG. 1. Additionally, at least a portion of composite stringer 26 is positioned in overlying relationship with first composite plank ply 40 as was discussed earlier with respect to wing 14 and fuselage 18.

Step 62 of positioning first composite plank ply 40 includes unidirectional fibers positioned within first composite plank ply 40, which extends in direction D' in which composite stringer 26 extends, as seen in FIG. 1 with respect to fuselage 18 or extends in direction D with respect to wings 14 as also seen in FIG. 1. Step 62 of positioning first composite plank ply 40 further includes one of first or second configurations for first and second composite plank plies 40, 40a.

A first configuration includes positioning second composite plank ply 40a positioned between a second pair of composite plies of composite plies 38 which includes in this example plies 38b and 38c. In this example, as seen in FIG. 4, each ply of first and second composite plank plies 40 and 40a has the same width dimension W' which extends with respect to fuselage 18 in a curvilinear direction CD, as seen in FIG. 3, in a transverse to direction D' in which composite stringer 26 extends along composite skin 34 of fuselage 18. With respect to wings 14, first and second composite plank plies 40 and 40a has the same width dimension W' which extends in a transverse direction to direction D in which composite stringer 26 extends along composite skin 34 of wings 14.

A second configuration includes positioning second composite plank ply 40a' positioned between a second pair of composite plies of composite plies 38 which includes in this example plies 38b and 38c. In this example, as seen in FIG. 5, each ply of first and second composite plank plies 40' and 40a' has a different width dimension, such as width dimension W3 and width dimension W4. Width dimensions W3 and W4 extend, with respect to fuselage 18 in a curvilinear direction CD as seen in FIG. 3, in a direction transverse to direction D' in which composite stringer extends along composite skin 34 of fuselage 18. With respect to wings 14, first and second composite plank plies 40' and 40a' has a different width, such as width dimension W3 and width dimension W4, which extends in a transverse direction to direction D in which composite stringer 26 extends along composite skin 34 of wings 14.

While various embodiments have been described above, this disclosure is not intended to be limited thereto. Variations can be made to the disclosed embodiments that are still within the scope of the appended claims.

What is claimed:

1. A composite assembly, comprising:
a composite skin of an aircraft comprising a plurality of composite plies;
a composite stringer secured to the composite skin, wherein:
a first composite plank ply is positioned between a first pair of composite plies of the plurality of composite plies of the composite skin;
the first composite plank ply has a width dimension less than a width dimension of the plurality of composite plies of the composite skin;
a second composite plank ply positioned within the plurality of composite plies of the composite skin;
the second composite plank ply has the width dimension of the first plank ply; and
the first composite plank ply and the second composite plank ply extend along a length of a wing of the aircraft, with the first composite plank ply and the second composite plank each comprising a plurality of unidirectional fibers which extend along the length of the wing of the aircraft; or
the first composite plank ply and the second composite plank ply extend along a central length of a fuselage of the aircraft, with the first composite plank ply and the second composite plank ply each comprising a plurality of unidirectional fibers which extend along the central length of the fuselage of the aircraft.

2. The composite assembly of claim 1, wherein the composite stringer comprises one of an I-stringer, hat stringer, J-stringer, blade stringer or Z-stringer.

3. The composite assembly of claim 1, wherein the composite skin extends along a length and a width of a wing of an aircraft.

4. The composite assembly of claim 3, wherein the composite stringer extends along the length of the wing of the aircraft.

5. The composite assembly of claim 1, further comprising the second composite plank ply is positioned between a second pair of composite plies of the plurality of composite plies of the composite skin.

6. The composite assembly of claim 1, further includes a third composite plank ply which has the width dimension of the first and second composite plank plies wherein the second plank ply is positioned between the first and the third composite plank plies.

7. The composite assembly of claim 5, wherein the first and second composite plank plies interleave with the first and second pair of composite plies of the plurality of composite plies of the composite skin of the wing, respectively.

8. The composite assembly of claim 5, wherein:
the first and second pair of composite plies of the plurality of composite plies of the composite skin of the wing are positioned within the first half of the stack of the plurality of composite plies of the composite skin of the wing; and
the first half of the stack of the plurality of composite plies of the composite skin of the wing is positioned on an interior side of the skin of the aircraft opposing an exterior side of the skin of the aircraft.

9. The composite assembly of claim 1, wherein the composite skin extends along a central length direction of the fuselage and in a curvilinear direction about the central length of the fuselage of the aircraft.

10. The composite assembly of claim 9, further comprising a second composite plank ply positioned between a second pair of composite plies of the plurality of composite plies of the composite skin of the fuselage.

11. The composite assembly of claim 10 wherein, the first and second composite plank plies each has the same width dimension which extends in the curvilinear direction about the central length of the fuselage.

12. The composite assembly of claim 10 wherein, the first and second composite plank plies each has a different width dimension which extends in the curvilinear direction about the central length of the fuselage.

13. The composite assembly of claim 10, wherein the first and second composite plank plies interleave with the first and second pair of composite plies, respectively, of the plurality of composite plies of the composite skin of the fuselage.

14. The composite assembly of claim 10 wherein:
the first and second pair of composite plies of the plurality of plies of the composite skin of the fuselage are positioned within the first half of the stack of the plurality of plies of the composite skin of the fuselage; and
the first half of the stack is positioned on an interior side of the skin of the fuselage of the aircraft opposing an exterior side of the skin of the fuselage of the aircraft.

15. A method for assembling a composite assembly, comprising the steps of:
laying up a plurality of composite plies for a composite skin of an aircraft;
positioning a first composite plank ply between a first pair of composite plies of the plurality of plies of the composite skin wherein the first composite plank ply has a width dimension less than a width dimension of the plurality of composite plies of the composite skin;
positioning a second composite plank ply within the plurality of composite plies for the composite skin, wherein the second composite plank ply has the width dimension of the first composite plank ply, wherein:
the first composite plank ply and the second composite plank ply extend along a length of a wing of the aircraft, with the first composite plank ply and the second composite plank ply each comprising a plurality of unidirectional fibers which extend along the length of the wing of the aircraft; or
the first composite plank ply and the second composite plank ply extend along a central length of a fuselage of the aircraft, with the first composite plank ply and the second composite plank ply each comprising a plurality of unidirectional fibers which extend along the central length of the fuselage of the aircraft; and
laying up a composite stringer for securement to the composite skin.

16. The composite assembly of claim 8, wherein a second half of the stack is positioned adjacent to an exterior of the aircraft and has an absence of a composite plank ply positioned within the second half of the stack of the plurality of composite plies of the composite skin of the wing.

17. The composite assembly of claim 14, wherein a second half of the stack positioned adjacent to an exterior of the aircraft has an absence of a composite plank ply positioned within the second half of the stack of the plurality of composite plies of the composite skin of the fuselage.

18. The composite assembly of claim 1, wherein at least a portion of the composite stringer is positioned in overlying relationship with the first composite plank ply.

19. The method of assembling of claim 15, wherein the first composite plank ply and the first pair of composite plies are positioned within a first half of a stack of the plurality of composite plies of the composite skin positioned adjacent an interior of an aircraft with an absence of a composite plank ply within a second half of the stack positioned adjacent to an exterior of the aircraft.

20. The method of assembling of claim 15, wherein at least a portion of the composite stringer is positioned in overlying relationship with the first composite plank ply.

\* \* \* \* \*